United States Patent
Nichols

[19]
[11] Patent Number: 5,875,805
[45] Date of Patent: *Mar. 2, 1999

[54] COMBINATION WALKING CANE ANIMAL STAKE

[76] Inventor: Charles W. Nichols, P.O. Box 8, Boxford, Mass. 01921

[*] Notice: This patent issued on a continued prosecution application filed under 37 CFR 1.53(d), and is subject to the twenty year patent term provisions of 35 U.S.C. 154(a)(2).

[21] Appl. No.: 702,864

[22] Filed: Aug. 26, 1996

Related U.S. Application Data

[63] Continuation of Ser. No. 433,934, May 2, 1995, abandoned.

[51] Int. Cl.⁶ ........................................................ A45B 3/00
[52] U.S. Cl. ................................ 135/66; 135/77; 119/788
[58] Field of Search .................................. 135/65, 66, 68, 135/78, 79, 81, 77; 119/786, 787, 788, 791

[56] References Cited

U.S. PATENT DOCUMENTS

| | | | |
|---|---|---|---|
| 39,854 | 9/1863 | Wemple | 135/81 X |
| 2,198,082 | 4/1940 | Harty | 135/79 X |
| 2,388,778 | 11/1945 | Wheeler | 135/68 |
| 3,157,187 | 11/1964 | Murcott | 135/68 |
| 4,428,390 | 1/1984 | Baird | 135/68 X |
| 4,787,405 | 11/1988 | Karwoski | 135/66 |
| 4,977,914 | 12/1990 | Smerker | 135/81 |
| 5,056,546 | 10/1991 | Sharp | 135/81 X |
| 5,193,567 | 3/1993 | Razny, Jr. | 135/68 |
| 5,295,498 | 3/1994 | Van Meter et al. | 135/65 |
| 5,495,867 | 3/1996 | Block | 135/65 |

FOREIGN PATENT DOCUMENTS

| | | | |
|---|---|---|---|
| 477182 | 9/1951 | Canada | 135/79 |

*Primary Examiner*—Lanna Mai
*Attorney, Agent, or Firm*—William J. Daley, Jr.

[57] ABSTRACT

A combination walking cane animal stake including first, second and third segments and a tip. The first, second and third segments, each have proximal and distal ends and a long axis. The third segment is interconnected to the first segment distal end and to the second segment proximal end, where the third segment long axis is at an angle with respect to the axis each of the first and second segments. The tip is interconnected to the second segment distal end and is configured so a portion of the second segment is inserted into the ground responsive to a force applied along at least the first segment long axis. The first, second and third segments are substantially straight sections, where each of the segments are interconnected to each other by bends. Further, the third segment long axis is at an angle in the range from about 35 to about 45 degrees and more particularly at an angle of 40 degrees with respect to the second segment long axis. Also, the third segment is interconnected to the first and second segments so the third segment is backwardly and downwardly sloped or forwardly and downwardly sloped.

13 Claims, 3 Drawing Sheets

COMBINATION WALKING CANE ANIMAL STAKE

This application is a continuation of application Ser. No. 08/433,934, filed May 2, 1995, now abandoned.

FIELD OF INVENTION

This invention relates to walking canes or sticks and more particularly to walking canes or sticks that are also useable as a means for temporarily securing an animal such as a dog so it does not run away.

BACKGROUND OF THE INVENTION

While walking or hiking in the woods, in a park, along a beach or along the side of a road, it is not uncommon to see an individual using a walking stick for stability and security. Such walking sticks are purchased or are obtained while walking by picking up a long stick or piece of wood, if there is one, from the ground. The walking sticks generally available for purchase include a straight section alone or in combination with a handle section or an ornamental top. The walking stick may also consist of a straight section and a top that functions in part like a seat. Such walking sticks or canes are disclosed in Design U.S. Pat. Nos. 261,199, 297,887, and 299,189.

There are also canes that provide stability to individuals recovering from surgery or illness as well as those who generally require the assistance of a walking stick or cane to walk. Some of these canes are designed for comfort and, in some cases, designed to reduce the impact to the shoulders and wrist of the user. Such canes are typically designed for use primarily on hard surfaces such as concrete walk, flooring and the like. These canes typically are provided with a tip specifically designed for stability such as a wide rubber tip or a structure, attached to the shaft of the cane, that has multiple, spaced legs for contacting the ground.

One walking cane 10, as shown in FIG. 1, is designed for those who have difficulty rising from a seated position. This cane includes two handle portions 12,14, where the lower handle portion 14 lets an individual push against it as they stand from the seated position. This cane 10 includes means 16 for adjusting the height of the shaft 20. The cane 10 includes a wide rubber tip 18 that contacts the hard surface or ground.

It is also common to see a person out walking their dog, such as along the roadside or along the beach, typically while the dog is on a leash or some sort of a tether. When the person wants to stop to rest or talk to another individual, the dog generally becomes restless and starts pulling on the leash, jumps up, and/or winds the leash around individual's legs. Similarly when one is traveling with a dog or other pet, there are typical no provisions in general made at rest stops, rest areas or fast food establishments for leashing or securing animals such as dogs. Thus, the animal's owner either has to hold the leash or has to tie the leash to some fixture such as sign post.

All of the above described walking sticks and canes are not intended to be driven into the ground but rather generally remain above the ground. Also, the design of these walking sticks or canes has been generally found not to be acceptable for use as a stake for securing an animal.

Therefore, it is an object of the present invention to provide a walking cane that is also useable as a stake for temporarily securing the leash or tether of an animal such as dog.

It is another object of the present invention to provide a walking cane that is generally resistant to the motion of the animal when it is secured to the walking stick.

It is a further object of the present invention to provide a walking cane that is easily used to secure an animal in rest areas and the like.

It is yet a another object of the present invention to provide a walking cane that can be easily and securely inserted into the ground.

It is yet a further object of the present invention to provide a walking cane that is light weight yet have sufficient strength and rigidity to withstand the forces imposed when an animal is secured to it and the cane is inserted into the ground.

SUMMARY OF THE INVENTION

The combination walking cane animal stake (i.e., cane/stake) of the instant invention results from the realization that a walking cane or stick can be used while a person is walking and also used as a stake for temporarily securing an animal such as a dog so it does not run off. In this way, the person who is walking can stop and rest or talk to another person without being bothered by the animal or having to constantly watch or attend to the animal so it does not run off. The cane/stake can also be used to temporarily secure animals at rest areas and the like.

The combination walking cane animal stake of the instant invention includes first, second and third segments and a tip. The first, second and third segments, each have proximal and distal ends and a long axis. The third segment is interconnected to the first segment distal end and to the second segment proximal end, where the third segment long axis is at an angle with respect to the long axis of each of the first and second segments. The tip is interconnected to the second segment distal end and it is configured so a portion of the second segment is inserted into the ground responsive to a force applied along at least the first segment long axis.

In preferred embodiments, the first, second and third segments are substantially straight sections where each of the segments are interconnected to each other by bends. Further, the third segment long axis is at an angle in the range from about 35 to about 45 degrees and more particularly at an angle of 40 degrees with respect to the second segment long axis. Also, the third segment is interconnected to the first and second segments so the third segment is backwardly and downwardly sloped. The cane/stake is made from a wide range of materials including but not limited to aluminum, steel and plastic that is in the form of a solid rod or a tubular product.

DESCRIPTION OF THE PREFERRED EMBODIMENT

Figure 1:
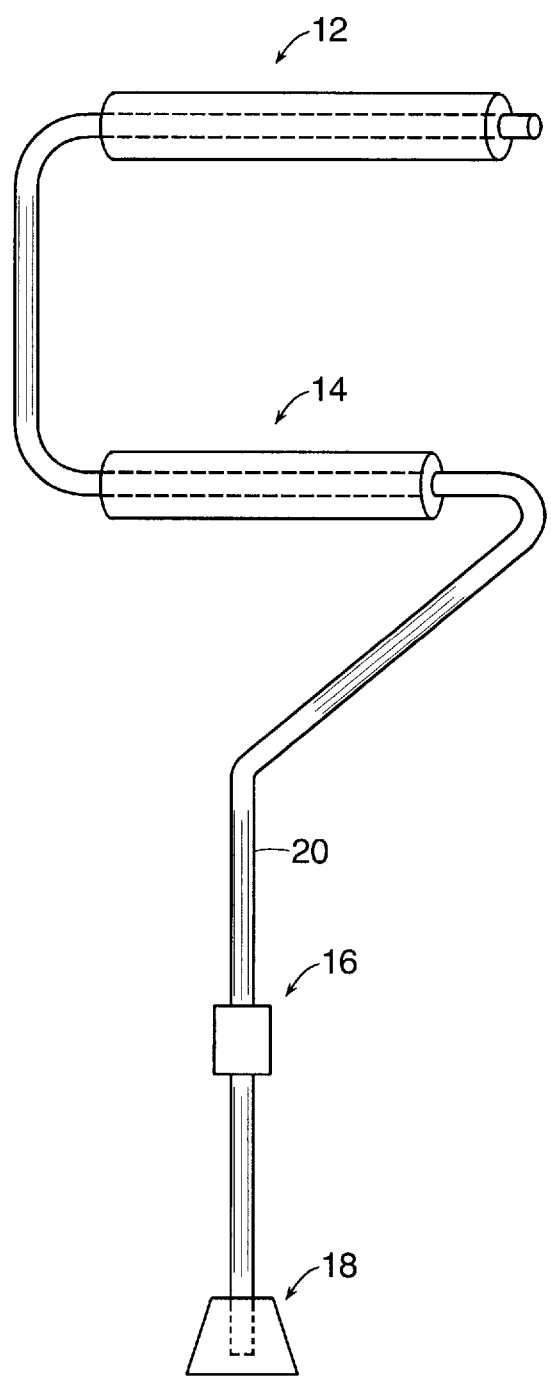
FIG. 1 is a side view of a walking cane having two handle portions.
Figure 2A:
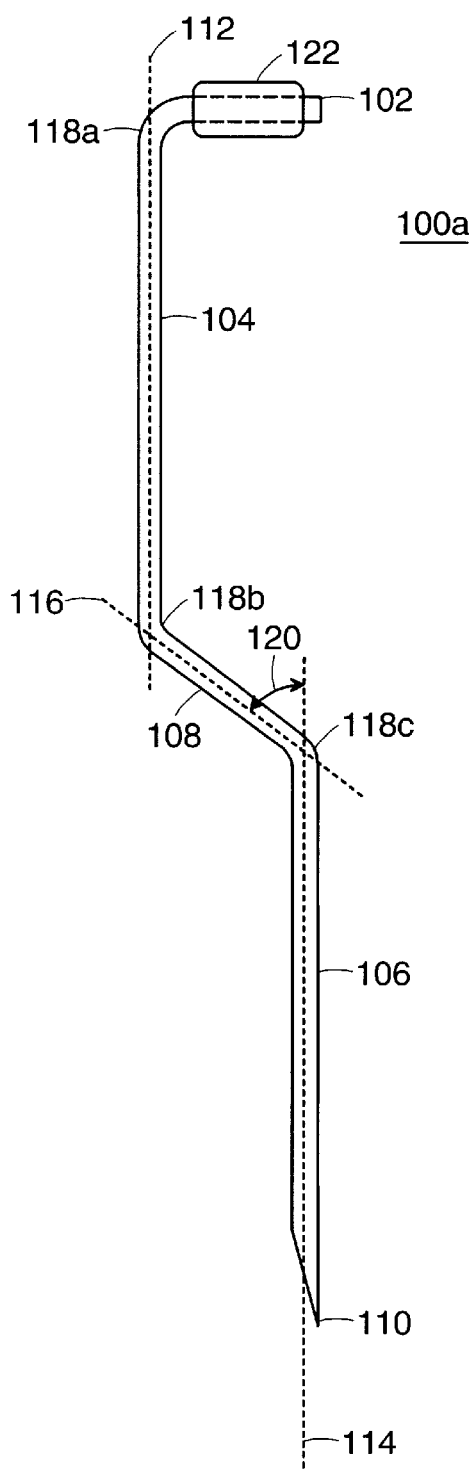
FIGS. 2A,B are side views of two embodiments of the walking cane animal stake of the instant invention.

There is shown in FIG. 2A one embodiment, the preferred embodiment, of a walking cane animal stake (i.e., cane/stake) 100a according to the instant invention. The cane/stake 100a is preferably a single integral structure made from a solid metal rod or metal tubing including, but not limited to aluminum, steel, galvanized steel, or solid plastic rod or tubing. The material thickness (e.g., diameter of an aluminum rod) is dependent upon the strength and type of material being used. For example, a ½ inch diameter aluminum rod is used to make the cane/stake 100a of the instant invention. The material selected preferably has a cylindrical shape, however, any other geometrically shaped material can be used as long as the lower section 106 can be relatively easily inserted into the ground.

The cane/stake 100a includes a handle 102, an upper or first vertical section 104, a lower or second vertical section 106 and a intermediate angled section 108 that interconnects the first and second lower sections 104,106. The upper and lower sections 104,106 and the intermediate section 108 are preferably straight sections that are interconnected to each other by bends 118a–c, for example a 5 diameter bend. The bends between each of the sections 102–106 and the handle 102 are desirable because a bend minimizes the possibility of crimping, especially if metal tubing is the material used when forming the cane/stake 100a. The bends 118a–c also maintain the strength of the material so it can withstand the forces imposed when being used as a walking stick, the forces imposed when pushing at least a part of the lower section 106 into the ground, and the forces imposed by the animal when it is secured to the cane/stake 100a.

The first bend 118a, the bend between the handle 102 and proximal end of the upper section 104, is preferably a right angle bend so the handle 102 is substantially parallel to the ground when the upper portion is vertical or generally perpendicular to the ground plane. The second bend 118b, the bend that interconnects the distal end of the upper section 104 and the proximal end of the intermediate angled section 108, and the third bend, the bend that interconnects the proximal end of the lower section 106 and the distal end of the intermediate section, are established so the long axis 116 of the intermediate section 108 is at an angle 120 in the range of from about 35° to about 45° and more particularly is an angle of 40°. The angle of the second and third bends 118b–c is also selected so the lower section long axis 114 is substantially parallel to the upper section long axis 112.

In the illustrated embodiment, the handle 102 is a straight section that preferably includes a cushioned grip 122. The cushioned grip 122 is generally provided for the comfort of the individual holding and walking with the cane/stake 100a. The handle 102 is also preferably integral with the rest of the cane/stake 100a as shown in the illustrated embodiment. This is not a limitation as the handle may be a separate piece that is interconnected to the upper section 104. Further, the handle 102 is made of any one of a number of materials or combinations thereof including, metals, plastics or woods. For example, the handle 102 may be a separate piece fabricated from wood and attached to the metal shaft in any number of fashions as is known in the art. In addition, it is within the scope of the present invention for the handle to have any of a number of shapes or configurations known to those skilled in the art. For example, the handle 102 is interconnected in such a fashion that the long axis of the handle 102 is at other than a right angle to the upper section long axis 112. Alternatively, the handle 102 can extend upward so it is essentially a continuation of the upper section 104.

Figure 3:
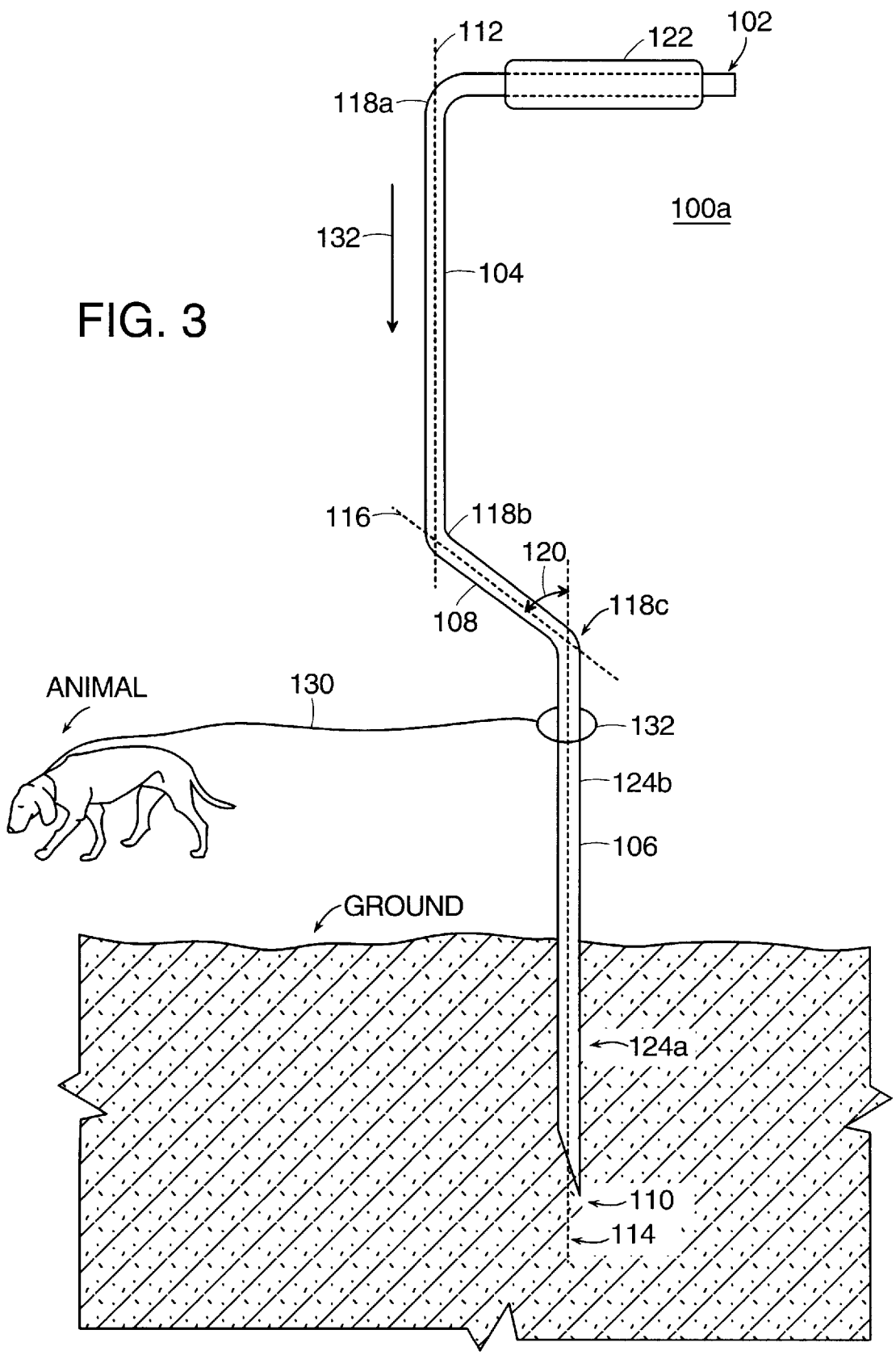
FIG. 3 is a side view of a walking cane animal stake when inserted into the ground.

The cane/stake 100a also includes a tip 110 that is configured, as discussed below in connection with FIG. 3, so the lower section 106 has the ability to be inserted into the ground. In one embodiment, the tip 110 is formed integrally with the lower section 106. For example, one end of a solid aluminum rod, being used to make the cane/stake 100a, is machined to provide a conically tapered tip 110 or an end that is cut on the bias to present a sloped surface tip. Alternatively, the tip 110 is a separate component affixed or attached to the distal end of the lower section 106. Whether to make the tip integral or to use a separate component is dependent upon a number of factors including the type of material used in making the lower section 106. For example, if a metal tubular product is used to make the lower section 106, then a separate solid material tip (e.g., a wooden conically tapered tip) is attached to the hollow metal tube. In contrast, if the material is a solid rod, then a sloped surface along the bias can be cut or machined into the solid material. In general, the tip 110 has any of a number of configurations known in the art that would permit the lower section to be inserted into the ground.

Figure 2B:
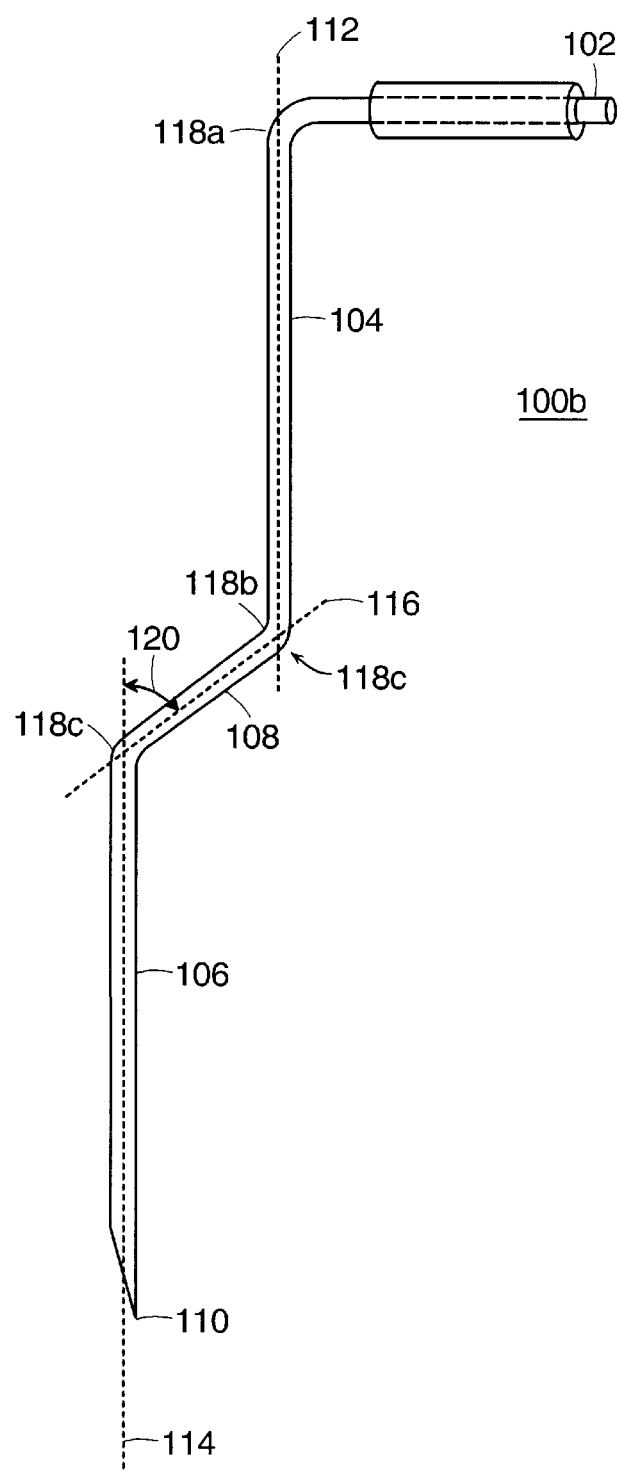

There is shown in FIG. 2B another embodiment of the instant invention, that also includes a handle 102, an upper section 104, a lower section 106, an intermediate angled section 108, and a tip 110. In this embodiment, the intermediate angled section 108 is interconnected to the upper and lower sections 104,106 in a fashion so the intermediate angled section is sloped downwardly and forwardly. In this configuration, the lower section 106 is forward of the upper section 104.

As noted above and as shown in FIG. 3, in addition to being used as a walking cane another use of the instant invention is as a stake to which one attaches or otherwise secures an animals's leash or tether 130. When a user wants to insert the cane/stake 100a (FIG. 2A) into the ground, the user pushes down on the handle section so a force general in a vertical direction 132 is applied to the upper and lower sections 104,106. In addition, the user may twist the cane/stake 100a back and/or forth about the lower section long axis 114 to assistant in the insertion of the lower section 106 into the ground.

After insertion, the user passes the loop 132 of the leash/tether 130 over respectively the handle 102 and the upper and intermediate sections 104, 108 until the loop is disposed below the third bend 118c. Alternatively, the user could tie the leash or tether to the lower section 106 below the third bend 118c. When the leash 130 is secured or disposed below the third bend 118c, the third and second bends 118b–c in conjunction with the intermediate section 108, prevent the leash from traveling further upward as a result of any motion by the animal. Thus, the force imposed on the lower section by the motion of the animal preferably will not cause the leash to travel upward beyond at least the second bend.

If the user wishes to continue walking and/or release the animal from being restrained by the cane/stake 100a, the user merely unhooks or unloops the leash and again uses the cane/stake 100a as a walking cane. Alternatively, the user can stand on the leash and pull the cane/stake 100a out of the ground and thereby freeing the leash.

When the lower section 106 is inserted, there is a portion 124a of the lower section 106 that is in the ground and a portion 124b that is above the ground. The length of the in-ground portion 124a is generally sufficient so the forces imposed on the cane/stake 100a by the animal secured thereto will not cause the in-ground portion 124a to come out of the ground or to works itself lose. In a preferred embodiment, the length of the lower section 106 is in the range of from about 16 to about 19 inches and more particularly the lower section length is about 16 inches. Typically, a person inserting the preferred embodiment would insert the second section 106 into the ground such that the length of the in-ground portion 124*a* is about 7–8 inches. The loop 132 of the leash 130 or the leash itself is secured to the above ground portion 124*b*, as described above.

The overall length or height of the cane/stake 100*a* (FIG. 2A) of the instant invention is set or selected so the cane/stake is at a comfortable height for using the cane/stake 100*a* as a walking stick. The length of the upper section 104 and the intermediate section 108 are also set so the cane/stake 100*a* can be comfortably used as a walking stick and generally reduces the required energy and hand motion to move the can/stake 100*a*. In an exemplary embodiment, the cane/stake 100*a,b* has an overall length in the range of from about 33 to about 37 inches, the handle 102 has a length of about 5 to 6 inches, the upper section 104 has a length of about 15 inches and the intermediate section 108 has a length of about 6 inches. Preferably, length of the handle 102 of the embodiment of FIG. 2A is such that the handle end is in line with the second section long axis 114.

While a preferred embodiment of the invention has been described using specific terms, such description is for illustrative purposes only, and it is to be understood that changes and variations may be made without departing from the spirit or scope of the following claims.

What is claimed is:

1. A combination walking cane animal stake, that is useable as one of a walking stick and an animal stake, and an animal tether having a handle portion, wherein said combination walking cane animal stake slidably restrains the handle portion of the animal tether when used to temporarily restrain an animal, said combination walking cane animal stake comprising:

first and second segments, each said segment having proximal and distal ends and a long axis;

a third segment having a long axis, being interconnected to the first segment distal end and to the second segment proximal end, where the third segment long axis is at an acute angle with respect to the axis each of said first and second segments;

wherein said first, second and third segments respectively have first, second and third lengths;

a tip being interconnected to the second segment distal end, said tip being configured so a portion of said second segment is removably insertable into the ground responsive to a force applied along at least the first segment long axis; and wherein the second length, the third length and the acute angles between the third segment long axis and the long axis of each of the first and second segments are established so the animal tether handle portion, as it moves responsive to motion of the restrained animal, remains disposed below the interconnection between said first and third segments, when said combination walking cane animal stake is being used as an animal stake and said second segment is inserted into the ground, and said walking cane animal stake being resistive to forces and loadings imposed thereon by the restrained animal when the animal tether handle portion is so disposed below the interconnection.

2. The combination walking cane animal stake of claim 1, wherein the said first, second and third segments are segments of a single piece of material.

3. The combination walking cane animal stake of claim 2, wherein said first, second and third segments are substantially straight sections and wherein each of said segments are interconnected to each other by bends.

4. The combination walking cane animal stake of claim 2, wherein said single piece of material is selected from a group consisting of solid metal rods, metal tubing, solid plastic rods and plastic tubing.

5. The combination walking cane animal stake of claim 4, wherein said single piece of material is a solid aluminum rod.

6. The combination walking cane animal stake of claim 1, wherein the third segment long axis is at an angle in the range from about thirty-five to about forty-five degrees with respect to the second segment long axis.

7. The combination walking cane animal stake of claim 6, wherein the third segment long axis is at an angle of about forty degrees with respect to the second segment long axis.

8. The combination walking cane animal stake of claim 1, further comprising a handle that is interconnected to the first segment proximal end.

9. The combination walking cane animal stake of claim 1, wherein said first, second and third segments and at least a portion of said handle are formed from a single piece of material.

10. The combination walking cane animal stake of claim 1, wherein the long axis of each said first, second and third segments lies in the same plane.

11. The combination walking cane animal stake of claim 1, wherein said third segment is interconnected to said first and second segments so as to be backwardly and downwardly sloped.

12. The combination walking cane animal stake of claim 1, wherein said first segment having a length of about 15 inches, said third segment having a length of about 6 inches and the combination walking cane animal stake having an overall length in the range of from about 33 to 37 inches.

13. The combination walking cane animal stake of claim 1, wherein the force being applied along the first segment long axis is such that an inserted portion of said second segment is inserted into the ground a sufficient distance so the inserted portion is resistive to the forces and loadings imposed on said walking cane animal stake by the restrained animal.

* * * * *